United States Patent Office 3,025,238
Patented Mar. 13, 1962

3,025,238
LUBRICATING OILS THICKENED TO A GREASE CONSISTENCY WITH CALCIUM SALTS OF LOWER FATTY ACIDS AND PHOSPHORUS SULFIDE-HYDROCARBON REACTION PRODUCTS
Joseph F. Lyons, Poughkeepsie, and Norman R. Odell, Fishkill, N.Y., assignors to Texaco Inc., New York, N.Y., a corporation of Delaware
No Drawing. Filed Nov. 6, 1959, Ser. No. 851,252
8 Claims. (Cl. 252—32.7)

This invention relates to improved lubricating greases thickened with complexes of calcium salts of low molecular weight fatty acids and calcium salts of phosphorus sulfide-hydrocarbon reaction products.

We have found that grease thickening complexes are obtained by heating together calcium salts of certain phosphorus sulfide-hydrocarbon reaction products and calcium salts of lower fatty acids, and that greases formed from such complexes have very superior lubricating properties including especially very exceptional load bearing properties. The phosphorus sulfide-hydrocarbon reaction products having the property of forming such complexes are those obtained by reacting olefins of intermediate chain length with relatively high proportions of phosphorus sulfide, which are considerably in excess of the proportions ordinarily employed for forming reaction products of this type for use as lubricating oil additives. The calcium salts of these reaction products are oil-soluble and do not form stable grease compositions when employed in lubricating oils even in high proportions without the calcium fatty acid salt.

The phosphorus sulfide-hydrocarbon reaction product is obtained by reacting a mono-olefin having a chain length in the range from about 8 to about 24 carbon atoms with a phosphorus sulfide such as $P_2S_3$, $P_2S_5$, $P_4S_3$, $P_4S_7$, etc. Suitable olefins include polymers, obtained by polymerizing unsaturated light hydrocarbons such as propylene or butylenes, and olefinic fractions obtained by dehydrogenation or cracking of petroleum fractions. The preferred olefins are substantially straight chain compounds having the olefinic double bond in the terminal position.

The reaction between the phosphorus sulfide and the olefin is carried out by heating the two reactants together at a temperature in the range from about 200° F. to about 500° F., preferably in about the range 300–450° F., until the reaction is substantially complete, which may require from about 30 minutes up to several hours, and ordinarily about 3–6 hours. The reaction is preferably carried out in an inert atmosphere, such as an atmosphere of nitrogen. The phosphorus sulfide is employed in the reaction in an amount equal to at least about 50 percent of the theoretical amount required for complete reaction of the olefin, ordinarily about 50–100 percent of the theoretical amount required, although an excess may also be employed. With $P_2S_5$, for example, the amount employed may range from about 50 percent to about 150 percent by weight of the olefin, depending upon the molecular weight of the latter. If desired, the reaction may be carried out in the presence of a sulfurizing agent, as described by J. W. Gaynor et al. in U.S. 2,316,087. Very advantageously, it is carried out in the presence of free sulfur in an amount equal to about 0.3–0.7 percent of the weight of the olefin.

The reaction product is preferably hydrolyzed by steaming at a temperature in the range 200–500° F., preferably at a temperature of about 300–400° F. before converting it to the calcium salt. However, conversion to the calcium salt may also be carried out directly without an intermediate hydrolyzing treatment, hydrolysis of the product occurring under the neutralization conditions including the presence of water and elevated temperatures.

The phosphorus sulfide-olefin reaction product is converted into the calcium salt by treating it with a reactive calcium compound such as calcium oxide, calcium hydroxide or calcium carbonate in the stoichiometric amount, or employing a small excess of the calcium compound such as to give about 0.5–5.0 percent by weight of the free calcium compound in the grease mixture. The reaction is suitably carried out at an elevated temperature, such as a temperature in the range of from about 100° F. to about 300° F., preferably at a temperature from about 100° F. to about 200° F. It is very advantageously carried out in the presence of at least a portion of the lubricating oil employed in the grease.

The grease thickening agent is formed by complexing the calcium salt of phosphorus sulfide-olefin reaction product described above with a calcium salt of a saturated lower fatty acid, containing from 1 to 4 carbon atoms per molecule. The complex is formed by heating together a mixture of the calcium salt of phosphorus sulfide-olefin reaction product and calcium fatty acid salt, preferably in the presence of at least a portion of the lubricating oil employed in the finished grease, at a temperature from about 50° F. to about 400° F. The reaction is preferably carried out at about 300–400° F., for about 30 minutes to about 3 hours, and most advantageously at about 300–350° F. for about 1–2 hours. The calcium fatty acid salt and calcium salt of phosphorus sulfide-olefin reaction product are suitably employed in the reaction in a weight ratio of from about 1:1 to about 5:1, and preferably from about 1:1 to about 3:1, respectively. The reaction mixture may be obtained by mixing together the preformed calcium salts, or it may be obtained by coneutralizing the phosphorus sulfide-olefin reaction product and lower fatty acid, preferably in at least a portion of the lubricating oil contained in the grease.

A mixture of inorganic and organic-substituted thiophosphorus acids is obtained when the phosphorus sulfide olefin reaction product is hydrolized. The reaction product obtained with $P_2S_5$ is thought to consist chiefly of $H_2RP(S)O_2$ and $H_3P(S)O_3$, which are converted to $Ca[RHP(S)O_2]_2$ and $Ca_3[P(S)O_3]_2$ by neutralization with a calcium compound. The complex which is formed by these salts and calcium fatty acid salts is thought to comprise mixed salts wherein both a phosphorus acid and a fatty acid radical are attached to a calcium atom.

The grease preparation is conveniently carried out employing the phosphorus sulfide-olefin reaction product without separation of the inorganic acids or their salts. However, if desired, the inorganic phosphorus acid compounds may be separated either before or after conversion to the calcium salts. Such separation may be carried out as disclosed, for example, by R. W. Watson in U.S. 2,688,612, by contacting the reaction product with an adsorbent material such as Attapulgus clay.

The grease compositions of this invention comprise a lubricating oil thickened to a grease consistency with a calcium salt complex of the character described above. Ordinarily the grease will contain from about 15 to about 60 percent, and preferably from about 20 to about 50 percent by weight of such complex. In addition, these greases may contain minor amounts of other materials of various types which do not impair their novel and advantageous characteristics as described above. Additives of various types conventionally employed in lubricating greases, such as oxidation inhibitors, corrosion inhibitors, extreme pressure agents, etc., may be employed. Additional thickening agents of various types may also be employed, such as the conventional fatty acid soaps and finely divided solids of various types.

The lubricating oils employed in these greases may be any oils of lubricating characteristics which are suitable for use in lubricating greases generally. Such oils include particularly the conventional mineral lubricating oils having Saybolt Universal viscosities in the range from about 75 seconds at 100° F. to about 225 seconds at 210° F., which may be either naphthenic or paraffinic oils or blends thereof. The preferred mineral oils are those having Saybolt Universal viscosities in the range from about 300 seconds at 100° F. to about 100 seconds at 210° F., which may be blends of lighter and heavier oils in the lubricating oil viscosity range.

Synthetic lubricating oils, which may be preferred for obtaining greases having special properties required for certain types of lubricating service, include oils prepared by cracking and polymerizing products of the Fischer-Tropsch process and the like, as well as other synthetic oleaginous compounds such as diesters, polyesters, polyethers, etc., having viscosities within the lubricating oil viscosity range. Examples of suitable diesters include the aliphatic dicarboxylic acid diesters, such as di-2-ethylhexyl sebacate, di(secondary amyl) sebacate, di-2-ethylhexyl azelate, di-iso-octyl-adipate, etc. A particularly suitable class of synthetic polyesters are those described in U.S. 2,628,974, obtained by reacting an aliphatic dicarboxylic acid with a glycol and a monofunctional aliphatic alcohol or acid. Examples of polyethers include particularly polyalkylene glycols such as polyethylene glycol and polypropylene glycol. The sulfur analogs of these diesters, polyesters and polyalkylene ethers are also suitable for use in the grease compositions of this invention. Examples of suitable compounds of this type include di-2-ethylhexylthiosebacate, di-n-octylthioadipate, polyethylenethioglycol and the reaction product of adipic acid, thioglycol and 2-ethylhexyl mercaptan.

The following example is given for the purpose of more fully disclosing the invention.

*Example*

A lubricating grease prepared from the following materials in the indicated proportions in percent by weight:

Ca soap of olefin-P$_2$S$_5$ reaction product_____ 12.3
Calcium acetate_____ 29.3
Excess lime_____ 3.1
Mineral lubricating oil_____ Remainder The mineral lubricating oil was a refined naphthenic distillate oil having a Saybolt Universal viscosity at 100° F. of about 330 seconds.

The calcium soap of the olefin-P$_2$S$_5$ reaction product was prepared in the following manner: A reaction mixture was prepared by adding 222 grams of P$_2$S$_5$ and 1.3 grams of sulfur to 262 grams of olefin maintained in an atmosphere of nitrogen. The olefin was a straight chain C$_{12}$ mono-olefin having the olefinic double bond in the terminal position. The mixture was heated under nitrogen to 375° F. with stirring and maintained at that temperature for four hours. The reaction product was then hydrolyzed by steaming at 375° F. for four hours. A brown translucent sticky gel was obtained having a neutralization number of 445.

The reaction product obtained as described above was employed in the grease preparation in the following manner: A grease kettle was charged with 126 grams of the phosphorus sulfide-olefin reaction product, 200 grams of mineral oil and 80.8 grams of lime in 300 grams of water. The mixture was heated with stirring to about 180° F. and maintained at 180–190° F. for two hours. The temperature was then increased and the product dehydrated for one hour at 315–320° F. The product was then allowed to cool while an additional 455.2 grams of mineral oil were added gradually. A fluid product was obtained. To this product 346 grams of calcium acetate and 300 grams of water were added and the mixture heated to 180° F. The mixture was maintained at 180–190° F. for one hour, thereafter dehydrated for one hour at 316–320° F. and then allowed to cool. It was drawn at 200° F. and passed through a Premier colloid mill twice at 0.002 inch clearance.

A glossy brown, stable grease was obtained as described above having very superior lubricating properties as shown by the following tests.

Dropping point, ASTM, °F_____ 500+
Penetration at 77° F. (¼ cone):
    Unworked _____ 275
    Worked, 60 strokes_____ 274
    Worked, 100,000 strokes_____ 238
Bomb oxidation test, ASTM (100 hrs. at 210° F.)
    lb. drop_____ 12
Dynamic water resistance, percent loss_____ 2.5
Mean Hertz load, kg_____ 90

The 90 kilogram mean Hertz load of this grease is exceptional, being very much higher than those obtained with conventional greases of the prior art, including both soap thickened greases and greases thickened with finely divided solids of various types. For example, a mean Hertz load of about 40–50 kilograms is obtained with greases thickened with complexes of calcium acetate and calcium higher molecular weight fatty acid soaps, which are considered to have superior load bearing properties.

In addition to the very exceptional load bearing properties, this grease of our invention also had the combination of high dropping point, high mechanical stability, water resistance and satisfactory oxidation resistance for an uninhibited grease, as shown by the data.

Obviously many modifications and variations of the invention as hereinbefore set forth may be made without departing from the spirit and scope thereof and only such limitations should be imposed as are indicated in the appended claims.

We claim:

1. A lubricating grease consisting essentially of a lubricating oil thickened to a grease consistency by means of a complex obtained by heating together a calcium salt of a C$_{1-4}$ fatty acid and a calcium salt of an olefin-phosphorus sulfide reaction product in a weight ratio from about 1:1 to about 5:1, respectively, said heating being carried out at about 300–400° F. for a period from about 30 minutes to about 3 hours, said olefin-phosphorus sulfide reaction product being obtained by heating a C$_{8-24}$ mono-olefin with a phosphorus sulfide at a temperature in about the range 200–500° F. for a period from about 30 minutes to about 6 hours until the reaction is substantially complete, employing at least about 50 percent by weight of the theoretical amount of phosphorus sulfide required for complete reaction of the olefin, and hydrolyzing the reaction product obtained.

2. A grease composition according to claim 1 wherein the said phosphorus sulfide is P$_2$S$_5$.

3. A grease composition according to claim 1 wherein the said calcium salt is calcium acetate.

4. A grease composition according to claim 1 wherein the said olefin is a substantially straight chain olefin having the olefinic double bond in the terminal position.

5. A grease composition according to claim 1 wherein the reaction between the mono-olefin and phosphorus sulfide is carried out in the presence of free sulfur in an amount equal to about 0.3 to 0.7 percent by weight of the said mono-olefin.

6. A grease composition according to claim 1 containing about 15–60 percent by weight of the said complex.

7. The grease composition according to claim 1 containing about 20–50 percent by weight of the said complex.

8. A grease composition according to claim 1 wherein the said lubricating oil is a mineral oil.

References Cited in the file of this patent
UNITED STATES PATENTS

| | | |
|---|---|---|
| 2,846,392 | Morway et al. | Aug. 5, 1958 |
| 2,859,178 | Forster et al. | Nov. 4, 1958 |
| 2,923,682 | Morway et al. | Feb. 2, 1960 |